United States Patent
Anderson et al.

(10) Patent No.: US 9,934,543 B2
(45) Date of Patent: Apr. 3, 2018

(54) SECURE TRAVELER FRAMEWORK

(71) Applicant: Bank of America Corporation, Charlotte, NC (US)

(72) Inventors: Hannah Anderson, Tampa, FL (US); Melissa Gillette, Chicago, IL (US); Rahul Isola, Charlotte, NC (US); Michael Wolf, Charlotte, NC (US); Peter Amisano, Lincoln, NE (US); Timothy Webster, Simi Valley, CA (US); Alexander Foley, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 221 days.

(21) Appl. No.: 14/802,615

(22) Filed: Jul. 17, 2015

(65) Prior Publication Data
US 2017/0017796 A1   Jan. 19, 2017

(51) Int. Cl.
*G06F 21/00* (2013.01)
*G06Q 50/26* (2012.01)
(Continued)

(52) U.S. Cl.
CPC ......... *G06Q 50/265* (2013.01); *G06F 21/552* (2013.01); *G06Q 50/30* (2013.01); *G06F 2221/2111* (2013.01)

(58) Field of Classification Search
CPC .... G06Q 50/265; G06Q 50/30; G06Q 10/025; G06Q 10/02; G06Q 10/04;
(Continued)

(56) References Cited

U.S. PATENT DOCUMENTS 7,026,928 B1 *  4/2006  Lane .............. G08B 21/02
                                        340/426.1
7,599,847 B2   10/2009  Block et al.
(Continued)

FOREIGN PATENT DOCUMENTS

WO       03069447 A3   12/2003

OTHER PUBLICATIONS

"About Cloudera", Cloudera, Inc., 2015 <http://www.cloudera.com/content/cloudera/en/about.html>.
(Continued)

*Primary Examiner* — Kendall Dolly
(74) *Attorney, Agent, or Firm* — Banner & Witcoff, Ltd.; Michael A. Springs

(57) ABSTRACT

A user, such as an employee of an institution, may travel overseas where data or devices may be compromised. Described herein is a system and method for receiving travel data for the user from a travel data source and receiving a list of countries with a high level of security threats where data security may be an issue. Based on the travel data for the user and the list of countries with a high level of security threats, it may be determined whether the user is entering a country with a high level of security threats. If so, one or more user devices associated with the user may be determined, and data security scans of the devices may be generated before, during, and/or after travel. Data security issues may be determined based on a comparison of the scans. A report of the issues may optionally be generated.

20 Claims, 20 Drawing Sheets

(51) Int. Cl.
*G06Q 50/30* (2012.01)
*G06F 21/55* (2013.01)

(58) Field of Classification Search
CPC .. G06Q 10/0838; G06Q 50/14; G06F 21/552; G06F 2221/2111
See application file for complete search history.

(56) References Cited

U.S. PATENT DOCUMENTS

| | | | |
|---|---|---|---|
| 7,788,499 | B2 | 8/2010 | Cameron et al. |
| 7,873,350 | B1 | 1/2011 | McDaniel et al. |
| 8,115,592 | B2* | 2/2012 | Spence ............... H04L 12/1895 340/1.1 |
| 8,175,580 | B1 | 5/2012 | McDaniel et al. |
| 8,302,193 | B1* | 10/2012 | Gardner ................. G06F 21/56 707/758 |
| 8,667,602 | B2 | 3/2014 | Turk et al. |
| 8,903,870 | B2 | 12/2014 | Turk et al. |
| 2003/0200142 | A1 | 10/2003 | Hicks et al. |
| 2003/0225612 | A1 | 12/2003 | DeSimone et al. |
| 2004/0172364 | A1 | 9/2004 | Murray et al. |
| 2005/0083171 | A1 | 4/2005 | Hamilton |
| 2007/0169109 | A1* | 7/2007 | Neswal ..................... G06F 8/61 717/174 |
| 2007/0185745 | A1 | 8/2007 | Schukraft |
| 2007/0240227 | A1* | 10/2007 | Rickman ............... G06Q 10/06 726/27 |
| 2008/0027749 | A1* | 1/2008 | Meyer ................ G06Q 10/0635 705/1.1 |
| 2010/0121563 | A1* | 5/2010 | Chavez ................. G06Q 10/08 701/533 |
| 2012/0053969 | A1 | 3/2012 | Schukraft |
| 2012/0331304 | A1 | 12/2012 | She et al. |
| 2013/0159055 | A1* | 6/2013 | Lerenc .................. G06Q 10/04 705/7.32 |
| 2013/0166607 | A1* | 6/2013 | Turk ...................... G06Q 10/04 707/803 |
| 2013/0305357 | A1* | 11/2013 | Ayyagari .............. H04W 12/06 726/22 |
| 2016/0285897 | A1* | 9/2016 | Gantman ............. G06N 99/005 |
| 2017/0103215 | A1* | 4/2017 | Mahaffey .............. G06F 21/577 |

OTHER PUBLICATIONS

"Cyber Security & Malware Protection", FireEye, retrieved Jun. 2, 2015 <https://www.fireeye.com/>.

"SQL Server Integration Services", Microsoft, retrieved Jun. 1, 2015 <https://msdn.microsoft.com/en-us/ms141026.aspx>.

"What is a DLL?", Microsoft, retrieved Jun. 4, 2015 <https://support.microsoft.com/en-us/kb/815065>.

"Travel Management", HRG Worldwide, Jun. 1, 2015 <http://www.hrgworldwide.com/Services/Travel-Management/Pages/default.aspx>.

"The Covert Way to find the Reference Count of DLL", Security Xploded, retrieved Jun. 4, 2015 <http://securityxploded.com/dllrefcount.php>.

"Our Approach", International SOS, 2015.

"What is Host Intrusion Prevention System (HIPS) and how does it work?", Pieter Arntz, May 11, 2013 <https://blog.malwarebytes.org/intelligence/2013/05/whatships/>.

"Carlson Wagonlit Travel", Carlson Wagonlit Travel—Business Travel and Management Company Home Page, retrieved Jun. 1, 2015 <http://www.carlsonwagonlit.com/en/>.

"American Express Travel: Flights, Hotels, Cars, Cruises & Vacation Packages", American Express, retrieved Jun. 1, 2015 <https://travel.americanexpress.com/home>.

"About SWABIZ", Southwest Airlines, retrieved Jun. 2, 2015 <https://www.swabiz.com/html/air/business-groups/about-swabiz.html>.

"About VirusTotal", VirusTotal, retrieved 2015, <https://www.virustotal.com/en/about/>.

* cited by examiner

1000

|  | Entry 1 | Entry 2 |
|---|---|---|
| Employee ID | ######1 | ######1 |
| Passenger Name Record (PNR) | PNR##1 | PNR##1 |
| Last name | <Last_Name> | <Last_Name> |
| First name | <First_Name> | <First_Name> |
| Address | FN.LN@domain#.com | FN.LN@domain#.com |
| Cell phone | ###-###-#### | ###-###-#### |
| From city | Charlotte | Singapore |
| From Airport Code | CLT | SIN |
| From country | United States | Singapore |
| To city | Singapore | Charlotte |
| To Airport Code | SIN | CLT |
| To country | Singapore | United States |
| Depart date | 10/28/2014 7:05 | 10/30/2014 15:15 |
| Arrival date | 10/29/2014 10:05 | 10/30/2014 17:56 |
| Airline name | Airline 1 | Airline 1 |
| Airline code | A1 | A1 |
| Flight number | XXXX | YYYY |
| Hotel name | HOTEL | |
| Address1 | ## HOTEL LANE | |
| Address2 | | |
| Phone | ###-###-#### | |
| Fax | | |
| Check in date | 10/28/2014 10:05 | |
| Check out date | 10/30/2014 11:05 | |
| Travel Threat | Low | Low |
| Medical Threat | Low | Low |
| Car rental company name | | |
| Car rental pick up city | | |
| Car rental pick up date | | |
| Car rental drop off city | | |
| Car rental drop off date | | |
| Ticket country | US | US |
| Agency | Travel Agency 1 | Travel Agency 1 |
| PNR Received Date | 2/4/2014 15:52 | 2/4/2014 15:52 |
| Last Updated Date | | |

|  | Entry 1 | Entry 2 |
|---|---|---|
| empid | XXXXXX1 | XXXXXX1 |
| associate_nbid | XXXXXXX | XXXXXXX |
| pnr | PNR##1 | PNR##1 |
| fname | <First_Name> | <First_Name> |
| lname | <Last_Name> | <Last_Name> |
| fromcity | New York | New York |
| fromcountry | United States | United States |
| tocity | Shanghai | Shanghai |
| tocountry | China | China |
| departingon | 9/20/2014 11:00 | 9/20/2014 11:00 |
| arrivaldatetime | 9/21/2014 13:55 | 9/21/2014 13:55 |
| sourceusername | CORP\XXXXXXX | CORP\XXXXXXX |
| detectedutc | 12:02:39 AM | 12:02:39 AM |
| serverid | MACHINE123 | MACHINE123 |
| sourceipv4 | ##.###.###.### | ##.###.###.### |
| sourceurl | file:///C:\PROGRAM FILES (X86)\PRODUCTIVITY\EMAIL.EXE | file:///C:\PROGRAM FILES (X86)\PRODUCTIVITY\EMAIL.EXE |
| targetipv4 | ##.###.###.### | ##.###.###.### |
| targetfilename | null | null |
| threatcategory | hip.Files | hip.Files |
| threateventid | 18000 | 18000 |
| threatseverity | 4 | 4 |
| receivedutc | 12:05:56 AM | 12:05:56 AM |
| signatureid | 2760 | 2762 |
| signaturetypeid | 1 | 1 |
| islogenabled |  |  |
| iscreatelocalexenabled |  |  |
| isdeleted |  |  |

|  | Entry 1 | Entry 2 |
|---|---|---|
| Personnel Number | #######1 | #######1 |
| Personnel ID | XXXXXXX | XXXXXXX |
| FullName | <First Middle Last > | <First Middle Last > |
| EmailAddress | FN.LN@domain#.com | FN.LN@domain#.com |
| PNR | PNR##1 | PNR##1 |
| FirstName | <First Name> | <First Name> |
| LastName | <Last Name> | <Last Name> |
| toCityName | Beijing | Hong Kong |
| toCountryName | China | Hong Kong (SAR) |
| fromCityName | Hong Kong | Beijing |
| fromCountryName | Hong Kong (SAR) | China |
| DepartDate | 03/Nov/2014 05:00:PM | 07/Nov/2014 04:30:PM |
| ArrivalDate | 03/Nov/2014 08:20:PM | 07/Nov/2014 08:20:PM |
| Machine | MACHINE123456, MACHINE234567, VMACHINE12345, VMACHINE23456 | MACHINE123456, MACHINE234567, VMACHINE12345, VMACHINE23456 |
| Band | 3 | 3 |
| HomeCountry | Hong Kong | Hong Kong |

| Name: | FIRST LAST | |
|---|---|---|
| Depart Date: | 11/28/2014 11:00 | |
| Return Date: | 11/29/2014 18:50 | |
| Machine Name: | MACHINE123456 | |
| Virus Positives: | 4 | |
| Snapshot Differential | | |
| Users | Count: 1 | |
| User | Sid | |
| XXXXXXX | S-1-1-11-11111111-11111111-11111111-1111111 | Accessed 11/25/2014 18:37 |

| Processes | Count: 13 | | | | | | |
|---|---|---|---|---|---|---|---|
| ProcessName | InstanceName | Hidden | ProcessId | ParentProcessId | ExecutableSize | ExecutableHash | FilePath |
| process1.exe | OS Search | FALSE | 4928 | 0 | 593408 | AD31942BDF3D594 | c:\OS\system32 |
| process2.EXE | process2.exe | FALSE | 7468 | 7564 | 2872320 | AC4C51EB24AA95B | C:\OS |
| process3.exe | process3.exe | FALSE | 5812 | 716 | 1842352 | 5DF87E77189E8215 | C:\OS\file1 |
| process4.exe | process4.exe | FALSE | 3680 | 716 | 202376 | 2B4584D81572872E | C:\Program Files\Comm |
| process1.exe | process1.exe | FALSE | 4928 | 716 | 593408 | AD31942BDF3D594 | C:\OS\system32 |
| process3.exe | SMS Agent Host | FALSE | 5812 | 0 | 1842352 | 5DF87E77189E8215 | C:\OS\file1 |
| process5.exe | OSHTTP Web Proxy | FALSE | 0 | 0 | 27136 | C78655BC80301D76 | C:\OS\system32 |
| process5.exe | Application Experie | FALSE | 600 | 0 | 27136 | C78655BC80301D76 | C:\OS\system32 |
| process6.exe | process6.exe | FALSE | 3784 | 7468 | 6676480 | 458F4590F80563EB | C:\OS\system32 |
| process5.exe | process5.exe | FALSE | 5296 | 716 | 27136 | C78655BC80301D76 | C:\OS\system32 |
| process5.exe | OS Image Acquisitic | FALSE | 5296 | 0 | 27136 | C78655BC80301D76 | C:\OS\system32 |
| process7.exe | process7.exe | FALSE | 7292 | 7468 | 1518480 | 7B8CBFDDD28510F | C:\Program Files (x86)\A |
| process8.exe | process8.exe | FALSE | 7488 | 7468 | 193536 | F2C7BB8ACC97F92 | c:\OS\system32 |

| Parameter | ServiceDllPath | ProcessType | ServiceDll | StartTime | UserName |
|---|---|---|---|---|---|
| /Embedding | | Services | | | LocalSystem |
| | | Application | | 11/24/2014 1:10 | CORP\XXXXXXX |
| | C:\Program Files\Common Files\Security\SystemC | Application | | 11/18/2014 18:48 | NT AUTHORITY\SYSTEM |
| /Embedding | | Application | | 11/18/2014 18:46 | NT AUTHORITY\SYSTEM |
| | | Application | | 11/18/2014 18:49 | NT AUTHORITY\SYSTEM |
| | | Services | | | LocalSystem |
| "-k LocalService | | Services | oshttp.dll | | NT AUTHORITY\LocalService |
| "-k netsvcs | C:\OS\System32 | Services | update.dll | | localSystem |
| C:\OS\system32\process6.exe" " | | Application | | 11/25/2014 18:41 | CORP\XXXXXXX |
| -k imgsvc | | Application | | 11/25/2014 18:41 | NT AUTHORITY\LOCAL SERVICE |
| "-k imgsvc | C:\OS\System32 | Services | stillimage.dll | | NT Authority\LocalService |
| C:\Program Files (x86)\PDF\Reader\Reader\proce | Application | | | 11/25/2014 18:41 | CORP\XXXXXXX |
| C:\OS\system32\process8.exe" " | | Application | | 11/25/2014 18:41 | CORP\XXXXXXX |

| DllCount | ServiceType | Is64BitProcess | Running | FileNameOnly | RootDirectory | UserId | VirusAnalysis |
|---|---|---|---|---|---|---|---|
| 70 | OWNPROCESS | FALSE | FALSE | FALSE | | 0 | FALSE |
| 210 | | FALSE | FALSE | FALSE | | 0 | FALSE |
| 173 | | FALSE | FALSE | FALSE | | 0 | FALSE |
| 59 | | FALSE | FALSE | FALSE | | 0 | FALSE |
| 70 | | FALSE | FALSE | FALSE | | 0 | FALSE |
| 173 | OWNPROCESS | FALSE | FALSE | FALSE | | 0 | FALSE |
| 0 | SHAREPROCESS | FALSE | FALSE | FALSE | | 0 | FALSE |
| 158 | SHAREPROCESS | FALSE | FALSE | FALSE | | 0 | FALSE |
| 45 | | FALSE | FALSE | FALSE | | 0 | FALSE |
| 43 | | FALSE | FALSE | FALSE | | 0 | FALSE |
| 43 | OWNPROCESS | FALSE | FALSE | FALSE | | 0 | FALSE |
| 5 | | FALSE | FALSE | FALSE | | 0 | FALSE |
| 29 | | FALSE | FALSE | FALSE | | 0 | FALSE |

| Metadata Differential | Count: 14 | | | |
|---|---|---|---|---|
| Id | Name | Collected Duplicate | Extension | Description |
| 80588 | Suspicious Transfer.pdf.jar | Responsive | jar | File, Archive |
| 82057 | Jan1Travelers.xls | Responsive | xls | File, Archive |
| 82340 | Incomplete Information.pdf.jar | Responsive | jar | File, Archive |
| 82386 | Incorrect Benefiacry.pdf.jar | Responsive | jar | File, Archive |
| 82387 | Invalid Pin.pdf.jar | Responsive | jar | File, Archive |
| 82467 | jars.7z | Responsive | 7z | File, Archive |
| 82504 | jars.zip | Responsive | zip | File, Archive |
| 120867 | test.exe | Responsive | exe | File, Deleted, Archive |
| 123876 | log.log | Responsive | log | File, Archive |
| 129975 | C1293D57.tmp | Responsive | tmp | File, Deleted, Archive |
| 82005 | testfolder.LNK | Responsive | LNK | File, Archive, Not Indexed |
| 120711 | testfolder.LNK | Responsive | LNK | File, Deleted, Archive, Not Indexed |
| 80553 | testfolder.lnk | Responsive | lnk | File, Archive |
| 101902 | testfolder.lnk | Responsive | lnk | File, Deleted, Archive |

| Accessed | Created | Written | LogicalSize | PhysicalSize | Hash |
|---|---|---|---|---|---|
| 11/25/2014 11:41 | 11/25/2014 11:41 | 11/13/2014 14:08 | 49971 | 53248 | 045779D35BE75385 |
| 11/25/2014 11:39 | 3/25/2014 10:12 | 11/25/2014 11:39 | 196096 | 196608 | 3B4619E951E53DF4 |
| 11/25/2014 11:41 | 11/25/2014 11:41 | 11/13/2014 14:08 | 49971 | 53248 | 045779D35BE75385 |
| 11/25/2014 11:41 | 11/25/2014 11:41 | 11/13/2014 14:08 | 49971 | 53248 | 045779D35BE75385 |
| 11/25/2014 11:41 | 11/25/2014 11:41 | 11/13/2014 14:08 | 49971 | 53248 | 045779D35BE75385 |
| 11/25/2014 11:41 | 11/25/2014 11:41 | 11/13/2014 18:02 | 50686 | 53248 | C34A334D8F358A3 |
| 11/25/2014 11:41 | 11/25/2014 11:41 | 11/13/2014 18:02 | 300286 | 303104 | 5F3C2C934B405463 |
| 11/24/2014 19:36 | 11/24/2014 19:36 | 11/25/2014 11:39 | 0 | 151552 | D41D8CD98F00B20 |
| 11/24/2014 22:11 | 11/24/2014 22:11 | 11/25/2014 11:39 | 171 | 171 | E07C20854BBF3451 |
| 3/25/2014 10:12 | 3/25/2014 10:12 | 3/25/2014 10:12 | 196096 | 196608 | 05C5C5C076C2CC4 |
| 11/25/2014 11:39 | 11/24/2014 22:26 | 11/25/2014 11:39 | 445 | 445 | 9E2C26C83A3BDD |
| 11/24/2014 22:26 | 11/24/2014 22:26 | 11/24/2014 22:26 | 445 | 445 | 21CBD5FE9332A6B |
| 11/25/2014 11:39 | 11/24/2014 22:26 | 11/25/2014 11:39 | 485 | 485 | 979F7E22A6F7E4CC |
| 11/24/2014 22:26 | 11/24/2014 22:26 | 11/24/2014 22:26 | 485 | 485 | 98C0E9B0FC3A478 |

| FullPath | Comments | VirusAnalysis |
|---|---|---|
| MACHINE123456\testfolder\Suspicious Transfer.pdf.jar | | Positive (045779d35be75385e64df707adee6cc5) |
| MACHINE123456\testfolder\Jan1Travelers.xls | | FALSE |
| \testfolder\Incomplete Information.pdf.jar | | Positive (045779d35be75385e64df707adee6cc5) |
| MACHINE123456\testfolder\Incorrect Benefiacry.pdf.jar | | Positive (045779d35be75385e64df707adee6cc5) |
| MACHINE123456\testfolder\Invalid Pin.pdf.jar | | Positive (045779d35be75385e64df707adee6cc5) |
| MACHINE123456\testfolder\jars.7z | | FALSE |
| MACHINE123456\testfolder\jars.zip | | FALSE |
| MACHINE123456\testfolder\test.exe | | FALSE |
| MACHINE123456\testfolder\log.log | | FALSE |
| MACHINE123456\testfolder\C1293D57.tmp | | FALSE |
| MACHINE123456\Users\XXXXXXX\AppData\Roaming\OSbrand\WordProc\Recent\testfc | | FALSE |
| MACHINE123456\Users\XXXXXXX\AppData\Roaming\OSbrand\WordProc\Recent\testfc | | FALSE |
| MACHINE123456\Users\XXXXXXX\AppData\Roaming\OSbrand\OS\Recent\testfolder.ln | | FALSE |
| MACHINE123456\Users\XXXXXXX\AppData\Roaming\OSbrand\OS\Recent\testfolder.ln | | FALSE |

| Registry Differential | | | | | |
|---|---|---|---|---|---|
| SearchTerm | Count: 3 | | | | |
| | RegistryPath | RegistryName | Type | Data | LastWritten |
| Hive:HKEY_LOCAL_MACHINE Key: | HKEY_LOCAL_MACHINE\Software\OSBrand\OS\CurrentVersion\Run\Testing | | REG_SZ | Test!!!! | 11/25/2014 18:37 |
| Hive:HKEY_LOCAL_MACHINE Key: | HKEY_LOCAL_MACHINE\Software\OS | Testtesttest | REG_SZ | TestValue!! | |
| Hive:HKEY_LOCAL_MACHINE Key: | HKEY_LOCAL_MACHINE\Software\OS | Thisisatest | | | |

FIG. 13H

SECURE TRAVELER FRAMEWORK

TECHNICAL FIELD

One or more aspects of the disclosure generally relate to computing devices, computing systems, and computer software. In particular, one or more aspects of the disclosure generally relate to computing devices, computing systems, and computer software that may be used to secure data available on a computing device of a user travelling to, through, or from an unsecured location.

BACKGROUND

Users, such as employees of an entity or other business, often travel overseas to other countries or cities. Cyber security in those countries or cities might be low, and the user's personal data or company data (or devices) may be compromised while the user travels overseas. To book travel, users may use a third party travel service or agency. However, there is a need for better data and device security in locations with a high level of security threats.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects as disclosed herein are directed to, for example, a system and method of receiving, at a computing device and from a travel data source, travel data for a user. The method may comprise receiving, at the computing device, a list of countries with a high level of security threats. Based on the travel data for the user and the list of countries with a high level of security threats, the computing device may determine whether the user is entering a country with a high level of security threats. In response to determining that the user is entering a country with a high level of security threats, a user device associated with the user may be determined. At a first time, a first data security scan of the user device may be generated, and at a second time later than the first time, a second data security scan of the user device may be generated. One or more data security issue of the user device may be determined based on a comparison of the first data security scan to the second data security scan.

In some aspects, the one or more data security issue of the user device may comprise one or more of execution of a process on the user device, a change to metadata on the user device, or a change to a registry on the user device. The method may comprise generating a report identifying the one or more data security issue determined based on the comparison.

The user device may have a data security exception. In response to determining that the user device has a data security exception, the computing device may remove the data security exception for the user device for a predetermined time period. The predetermined time period may comprise a duration of travel for the user or a duration that the user will be located in the country with a high level of security threats.

In some aspects, a computing device may generate an electronic pre-travel communication that provides data security training resources to the user. The pre-travel communication may be placed in a communication queue to be sent to the user a predetermined time period prior to travel. A computing device may additionally or alternatively generate an electronic post-travel communication that provides a post-travel survey to the user. The post-travel communication may be placed in a communication queue to be sent to the user a predetermined time period after travel or after the user is expected to leave the country with a high level of security threats.

BRIEF DESCRIPTION OF THE DRAWINGS

The present disclosure is illustrated by way of example and not limited in the accompanying figures in which like reference numerals indicate similar elements and in which:

FIG. 10 illustrates example travel data in which various aspects of the disclosure may be implemented.

FIG. 11 illustrates example data from a data log in which various aspects of the disclosure may be implemented.

FIG. 12 illustrates example summary of scanned devices in which various aspects of the disclosure may be implemented.

FIGS. 13A-H illustrate an example analysis report for scanned data in which various aspects of the disclosure may be implemented.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
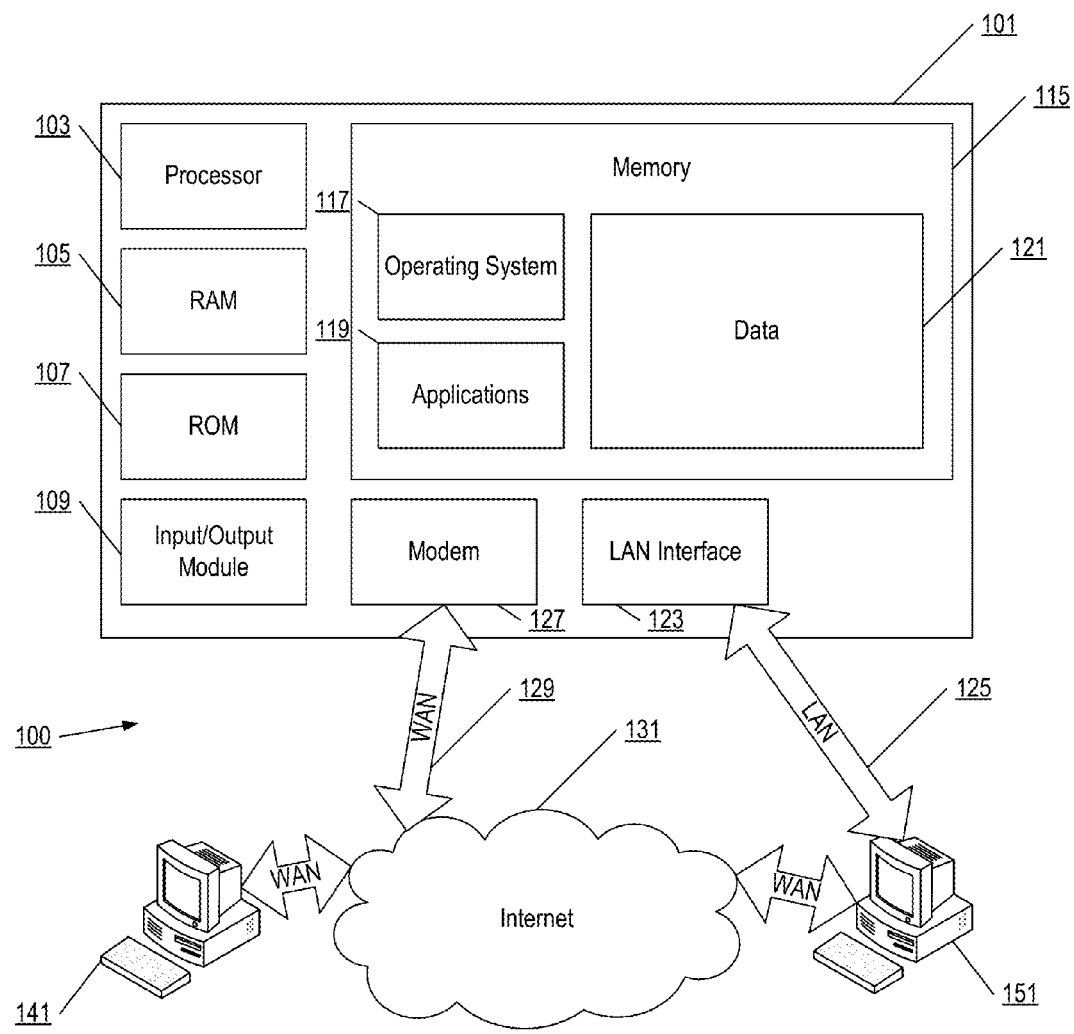
FIG. 1 illustrates an example operating environment in which various aspects of the disclosure may be implemented.

FIG. 1 illustrates an example block diagram of a computing device 101 (e.g., a computer server, desktop computer, laptop computer, tablet computer, other mobile devices, and the like) in an example computing environment 100 that may be used according to one or more illustrative embodiments of the disclosure. The computing device 101 may have a processor 103 for controlling overall operation of the server and its associated components, including for example random access memory (RAM) 105, read-only memory (ROM) 107, input/output (I/O) module 109, and memory 115.

I/O module 109 may include, e.g., a microphone, mouse, keypad, touch screen, scanner, optical reader, and/or stylus (or other input device(s)) through which a user of computing device 101 may provide input, and may also include one or more of a speaker for providing audio output and a video display device for providing textual, audiovisual, and/or graphical output. Software may be stored within memory 115 and/or other storage to provide instructions to processor 103 for enabling computing device 101 to perform various functions. For example, memory 115 may store software used by the computing device 101, such as an operating system 117, application programs 119, and an associated database 121. Additionally or alternatively, some or all of the computer executable instructions for computing device 101 may be embodied in hardware or firmware (not shown).

The computing device 101 may operate in a networked environment supporting connections to one or more remote computers, such as terminals 141 and 151. The terminals 141 and 151 may be personal computers or servers that include any or all of the elements described above with respect to the computing device 101. The network connections depicted in FIG. 1 include a local area network (LAN) 125 and a wide area network (WAN) 129, but may also include other networks. When used in a LAN networking environment, the computing device 101 may be connected to the LAN 125 through a network interface or adapter 123. When used in a WAN networking environment, the computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 101 and/or terminals 141 or 151 may also be mobile terminals (e.g., mobile phones, smartphones, PDAs, notebooks, tablets, and the like) including various other components, such as a battery, speaker, and antennas (not shown).

The disclosure is operational with numerous types of general purpose or special purpose computing devices. Examples of well-known computing devices that may be suitable for use with the disclosure (including the system of FIG. 1) include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
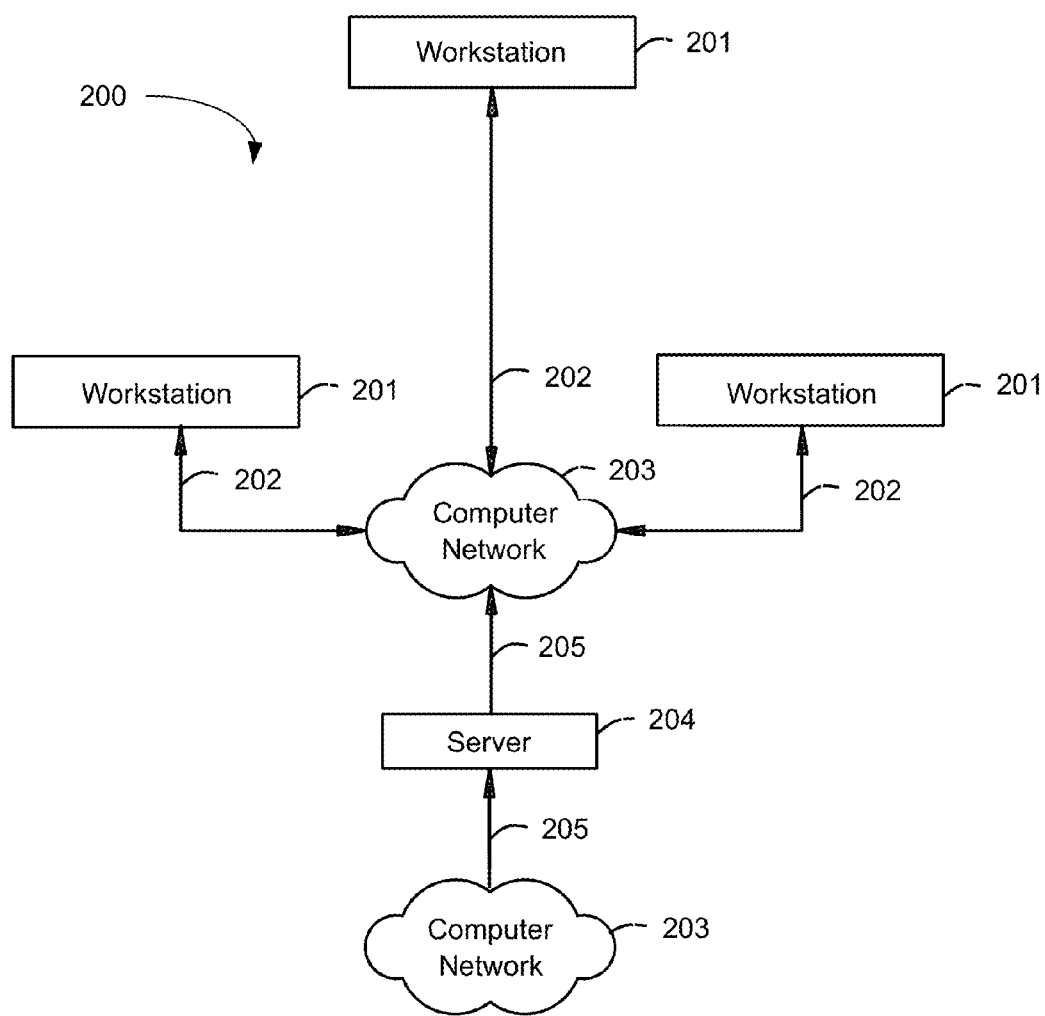
FIG. 2 illustrates another example operating environment in which various aspects of the disclosure may be implemented.

FIG. 2 illustrates another example operating environment in which various aspects of the disclosure may be implemented. An illustrative system 200 for implementing methods according to the present disclosure is shown. As illustrated, system 200 may include one or more workstations 201. The workstations 201 may be used by, for example, agents or other employees of an institution (e.g., a financial institution) and/or customers of the institution. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

Figure 3:
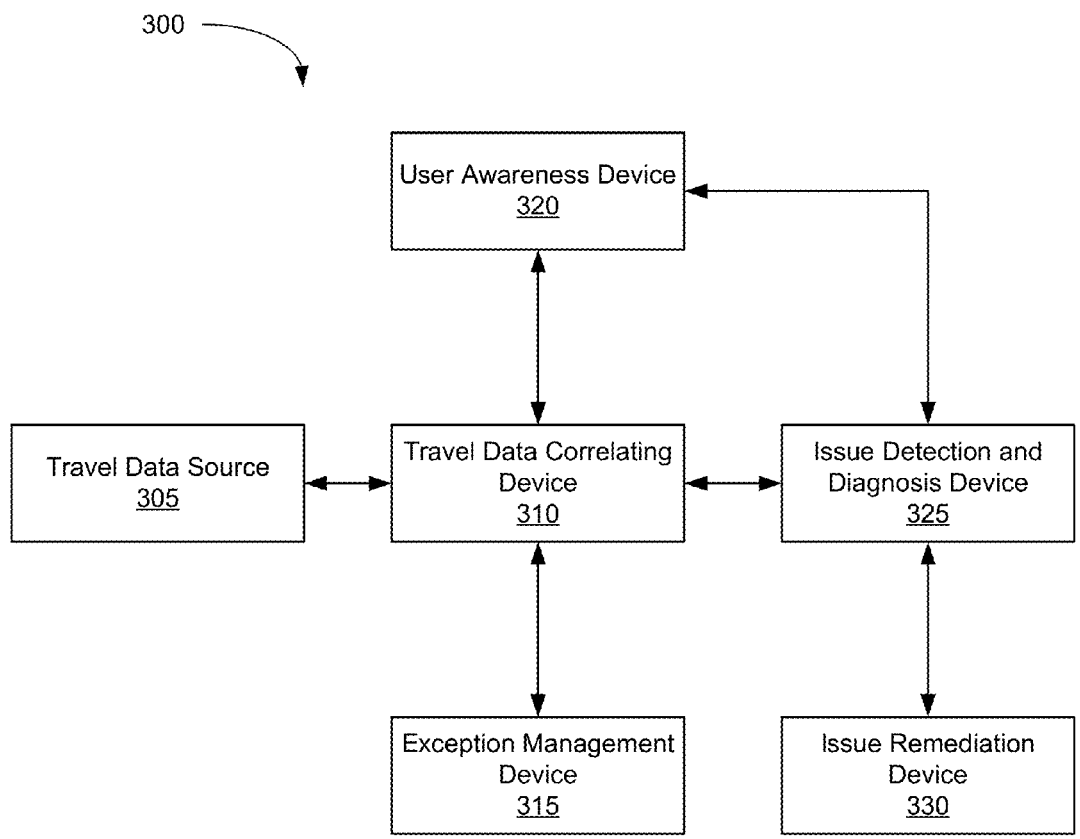
FIG. 3 illustrates yet another example operating environment in which various aspects of the disclosure may be implemented.

FIG. 3 illustrates yet another example operating environment 300 in which various aspects of the disclosure may be implemented. The operating environment 300 may comprise a travel data source 305 having travel data for one or more users. The travel data may identify the traveler, the origin, the destination, and the date of travel, among other information. The travel data may originate from a database of a third party travel booking service, such as a business travel service or agency. The travel data source 305 may also comprise a list of locations (e.g., cities, countries, and the like) that have been classified as locations with a high level of security threats for data security. Classification of countries with a high level of security threats may be provided by a separate, third party assessment used to determine the list.

Data from the travel data source 305 may be sent to a travel data correlating device 310 of the operating environment 300. The travel data correlating device 310 may be configured to correlate travel data and users with a list of locations with a high level of security threats. The travel data correlating device 310 may also be configured to communicate with exception management device 315 to handle exceptions for users traveling to different countries. For example, a user may be exempt from a particular data security measure, but may also be traveling to a country with a high level of security threats. The exemption management device 315 may temporarily remove the user's exemption while the user travels in the country with the high level of security threats, as will be described in further detail below.

The travel data correlating device 310 may be configured to communicate with a user awareness device 320. The user awareness device 320 may be configured to send a pre-travel message to the user, the message comprising a link to data security training. The user awareness device 320 may also be configured to send a pre-travel message indicating to the user that an exemption will be temporarily removed during travel if the user has an exemption. The user awareness device 320 may also send a post-travel message to the user, providing the user with a survey (or link to a survey) comprising post-travel questions.

The travel data correlating device 310 may be configured to communicate with an issue detection and diagnosis device 325. The issue detection and diagnosis device 325 may be configured to detect data security issues based on a pre-travel scan and a post-travel scan of the user's device(s), based on scans performed on the user's device(s) during the trip, and/or based on results of a post-travel survey completed by the user. The issue detection and diagnosis device 325 may send issues to an issue remediation device 330. The issue remediation device 330 may remediate or otherwise address the data security issues detected and diagnosed by the issue detection and diagnosis device 325. Operations performed by each of the travel data source 305, the travel data correlating device 310, the exception management device 315, the user awareness device 320, the issue detection and diagnosis device 325, and the issue remediation device 330 will be described in further detail below. Moreover, each of the devices illustrated in FIG. 3 may comprise a computing device or a network of computing devices having various computing components, as described herein.

Figure 4:
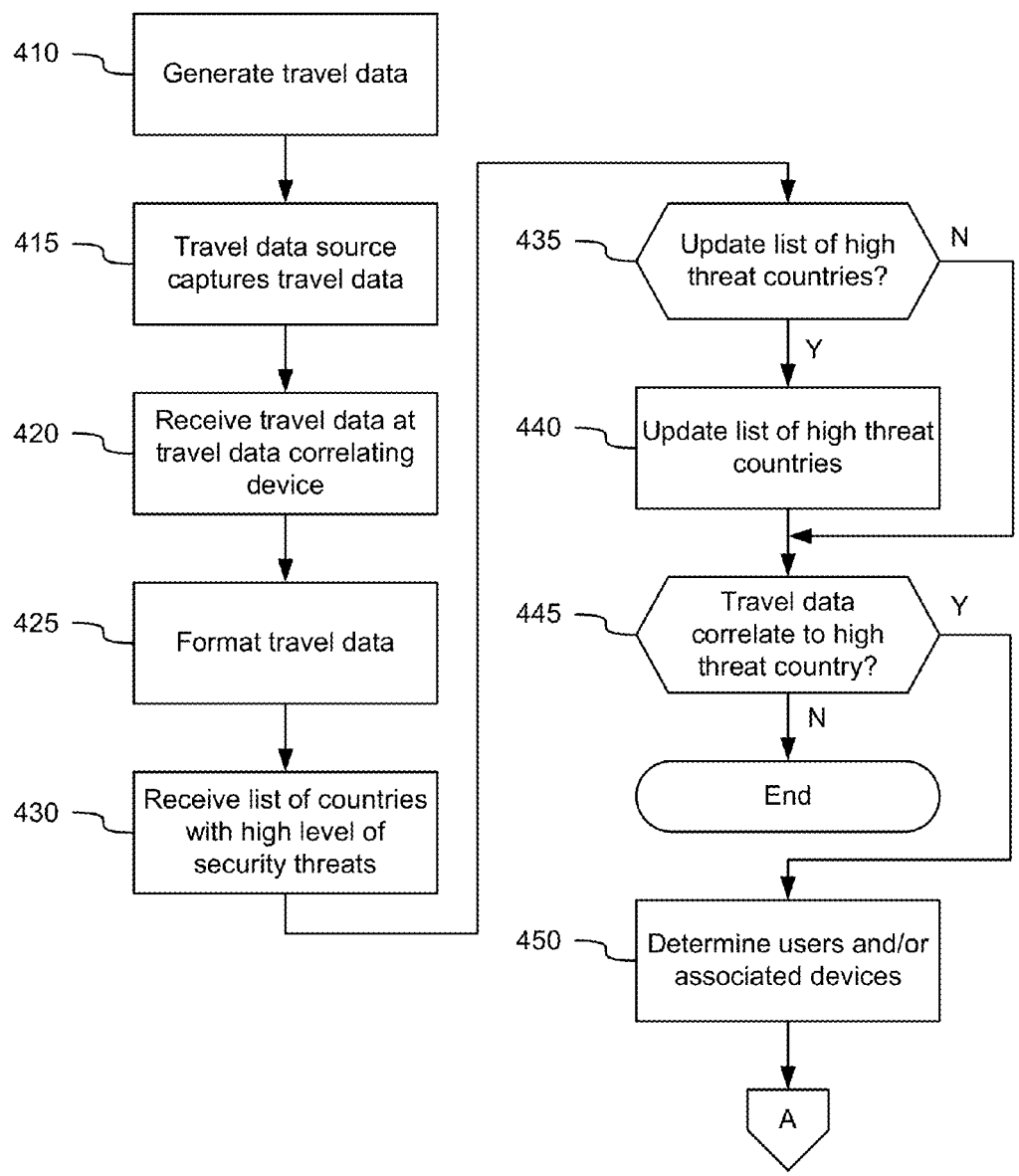
FIG. 4 illustrates an example of at least a portion of a flow diagram for receiving and processing travel data in which various aspects of the disclosure may be implemented.

FIG. 4 illustrates an example of at least a portion of a flow diagram for receiving and processing travel data in which various aspects of the disclosure may be implemented. A user, such as an employee of an institution or other business, may plan to travel overseas. The user's travel may take him or her to a country with a high level of security threats where data security might be an issue. Data accessible from the user's portable devices (e.g., laptop computer, tablet, smartphone, smartwatch, and the like) may be more likely to be compromised in a country with a high level of security threats versus other countries. The data may include the user's personal data and/or company data.

In some aspects, the user may book travel using a third party or business travel service. In step 410, a computing device may generate travel data, such as from the third party travel booking. In step 415, a travel data source may capture the travel data, such as from a travel itinerary. For example, the computing device may store the travel data from a plurality of third party travel services in a secure database. In other words, the travel data source may aggregate travel data from multiple travel agencies that a particular entity utilizes across the globe. The travel data source may send the captured travel data to a travel data correlation device. The data source may send the data as it is generated (e.g., in real-time or near real-time) and/or may send the data periodically, such as hourly, daily, and the like. In some aspects, the travel data source may send the travel data to a secure location, such as a File Transfer Protocol (FTP) site of the entity. In some aspects, the data sent to the travel data correlation device may be formatted by the travel data source or may comprise raw travel data.

FIG. 10 illustrates example travel data 1000 in which various aspects of the disclosure may be implemented. The travel data 1000 may be sent by the travel data source 305 to the travel data correlating device 310. FIG. 10 illustrates two entries for the same user, entry 1 and entry 2. Entry 1 may comprise the user's departure travel information (e.g., for travel from Charlotte, N.C. to Singapore, Singapore), and Entry 2 may comprise the user's return travel information (e.g., for travel from Singapore to Charlotte). The travel data 1000 is not limited to two entries, and may include entries for a plurality of users and/or a plurality of trips for each user.

The travel data 1000 may comprise information identifying the user (e.g., an employee), such as the employee ID, Passenger Name Record (PNR), last name, first name, email address, and/or cell phone number. The travel data 1000 may also comprise flight information, such as a departure (or from) city (e.g., Charlotte or Singapore), a departure airport code (e.g., CLT or SIN), a departure country (e.g., United States or Singapore), an arrival city (e.g., Singapore or Charlotte), an arrival airport code (e.g., SIN or CLT), an arrival country (e.g., Singapore or United States), a departure date (e.g., 10/28/2014 7:05 or 10/30/2014 15:15), an arrival date (e.g., 10/29/2014 10:05 or 10/30/2014 17:56), the airline name (e.g., Airline 1), the airline code (e.g., A1), and/or the flight number (e.g., XXXX or YYYY). The travel data 1000 may comprise information for the traveler's accommodations, such as a hotel name, a hotel address, a hotel phone number, a check in date, and/or a check out date.

The travel data 1000 may also indicate the level of travel threat of the user (e.g., low, medium, or high) and/or the level of medical threat of the user (e.g., low, medium, or high). The travel threat and medical threat information may be provided by the user, or the travel data source may determine the threat information based on information provided by the user. The travel threat and medical threat information may be used for post-analytical correlation, assessments, and/or metrics for the secure traveler framework. The information may also be used as additional information included in a ticket opened for travel (e.g., a trouble ticket), as will be described in further detail below.

The travel data 1000 may also indicate car rental information, such as a car rental company name, a car rental pick up city, a car rental pick up date, a car rental drop off city, and/or a car rental drop off date. The travel data 1000 may indicate the issuing ticket country, such as the United States. The travel data 1000 may also identify the travel service used to book the user's travel, such as the name of the travel agency (e.g., Travel Agency 1) and/or the time and date of the booking (e.g., 2/4/2014 15:52). The travel data 1000 may also comprise a last update date indicating the last time the user's travel data (e.g., travel itinerary) was updated.

Returning to FIG. 4, in step 420, the travel data correlating device may receive the travel data from the travel data source. As previously explained, the received data may be formatted or unformatted. If the data is unformatted or the travel data correlating device otherwise determines to format the data, in step 425, the travel data correlating device may format the travel data received from the travel data source. Formatting the travel data may comprise, for example, transforming the data into a format that the travel data correlating device may use in order to determine whether the user is traveling to any countries with a high level of security threats, as will be described in further detail below. For example, the travel data correlating device may extract, from the travel data, the user's identifier (e.g., employee ID, PNR, email address, and the like) and the countries listed in the user's travel itinerary.

In step 430, the travel data correlating device may receive a list of countries with a high level of security threats from another data source. The device may comprise a travel data interface, such as a web or portal interface, that receives the data. The interface may also be used to generate reports and to facilitate changes to received data (whether manually by a person or automatically by a device).

The travel data source (or other third party device) may determine the list of countries with a high level of security threats and send the list as, for example, a country threat evaluation report. Many factors may be considered in determining countries with a high level of security threats, including cyber activity occurring within the country and/or cyber activity originating from the country. For example, a computing device or network may monitor data security events occurring within or originating from the country, such as data leaks, infiltration of data, data exfiltration or extrusion from computing devices, malware events, identity theft, and the like. Other factors may comprise the frequency that cyber criminals target out of town travelers, and the number of cyber criminals in the country, among numerous other factors. In some aspects, the country threat evaluation report received by the travel data correlating device may indicate a plurality of categories of countries, such as countries with a high level of security threats, countries with a medium level of security threats, and countries with a low level of security threats. The report may also indicate or trigger the factors used to classify each country in each category. This information may be used, e.g., as a trigger, to determine whether to add or remove countries from the list of countries with a high level of security threats, as will be described in further detail below.

In step 435, the travel data correlating device may determine whether to update the list of countries with a high level of security threats received from the travel data source, such as by adding or removing countries from the list. If so (step 435: Y), the computing device may update the list in step 440. In some aspects, the computing device may keep on the list all of the countries with a high level of security threats identified by the travel data source. The computing device may also add countries to the list of countries with a high level of security threats, such as one or more of the countries included in the list of countries with a medium level of security threats. The computing device may move a country from the medium threat level list to high threat level list if a particular factor (or combination of factors) weighs into placing the country on the medium threat level list rather than the low threat level list. For example, if the received report indicates that Country A is included on the medium threat level list because of a particular factor (e.g., factor 1) or a particular combination of factors (e.g., factor 2 and factor 7), the travel data correlating device may move the country to the high threat level list in step 440. In other words, the travel data correlating device may re-categorize a country with a medium level of security threats as a country with a high level of security threats if certain flags for that country are raised in the data received from the travel data source or other data sources.

The travel data correlating device may also add countries to the country threat list based on previous experiences by employees of the institution visiting a particular country. For example, the computing device may track, for each country, the number of past data security incidents involving employees of the institution (e.g., data breaches, installed malware, unauthorized registry changes, and the like). If the number exceeds a threshold (e.g., 10 incidents, 100 incidents, and the like) for a particular country, the travel data correlating device may add the country to the high threat level list (if not already on the list). Additionally or alternatively, the device may add a particular country to the list if the percentage of past data security incidents exceeds a threshold (e.g., more than 5% of employees traveling to Country A receive malware; more than 20% of employees traveling to Country B lose data; and the like). In some aspects, countries may manually be added to the high threat level list, by an administrator of the institution.

Returning to FIG. 4, in step 445, the travel data correlating device may correlate the travel data with the list of countries with a high level of security threats. The device may scan the travel data received from the travel data source for any countries considered to have a high level of security threats. For example and with reference to FIG. 10, the device may scan the travel data 1000 for any countries and/or cities identified as having a high level of security threats, such as in the from or to city fields, the from or to airport code fields, or the from or to country fields. In some instances, the user may be travelling from a country with a low level or a medium level of security threats to another country with a low level or a medium level of security threats but connecting through a country with a high level of security threats. The travel data 1000 may indicate the intermediate country with a high level of security threats (not illustrated), and the travel data correlating device may identify the intermediate country with a high level of security threats. In other words, the device may identify a country with a high level of security threats listed anywhere in the itinerary even if the person has multiple stops or connections.

The device may also correlate the travel data with employee data stored in, for example, an employee database (e.g., a secure traveler database). The employee database may be accessed via an application program interface (API). The employee database may include data on employees of the entity, including name, email, phone number, employee ID, job code, job title, line of business, associated devices and device IDs (e.g., IP address, MAC address, host name, network ID, phone number), countries visited, and the like. The device may correlate the travel data received from the travel data source with an employee identified in the database by matching information from the travel data source with information from the employee database (e.g., name, employee ID, email address, phone number, and the like). The device may associate the travel data with the appropriate employee and store the travel data in the employee database.

If the travel data received from the travel data source does not correlate to any countries with a high level of security threats (step 445: N), the process may end, and the system may wait to receive additional travel data to determine whether any new travel data identifies a country with a high level of security threats. On the other hand, if the travel data does correlate to a country with a high level of security threats (step 445: Y), the travel data correlating device may proceed to step 450.

In step 450, if a country with a high level of security threats is identified, the device may determine which user(s), such as in the employee database, will be traveling to, through, or from the country with a high level of security threats. For example, the device may identify the user based on Employee ID, PNR, last name, first name, email address, or based on any other information identifying the user. The device may also identify any mobile devices associated with the employee, such as a laptop, a tablet, a smartphone, a smartwatch, or any device that the user might bring on the trip. Information identifying these devices may be stored in the employee database. The method may proceed to step 510 illustrated in FIG. 5.

Figure 5:
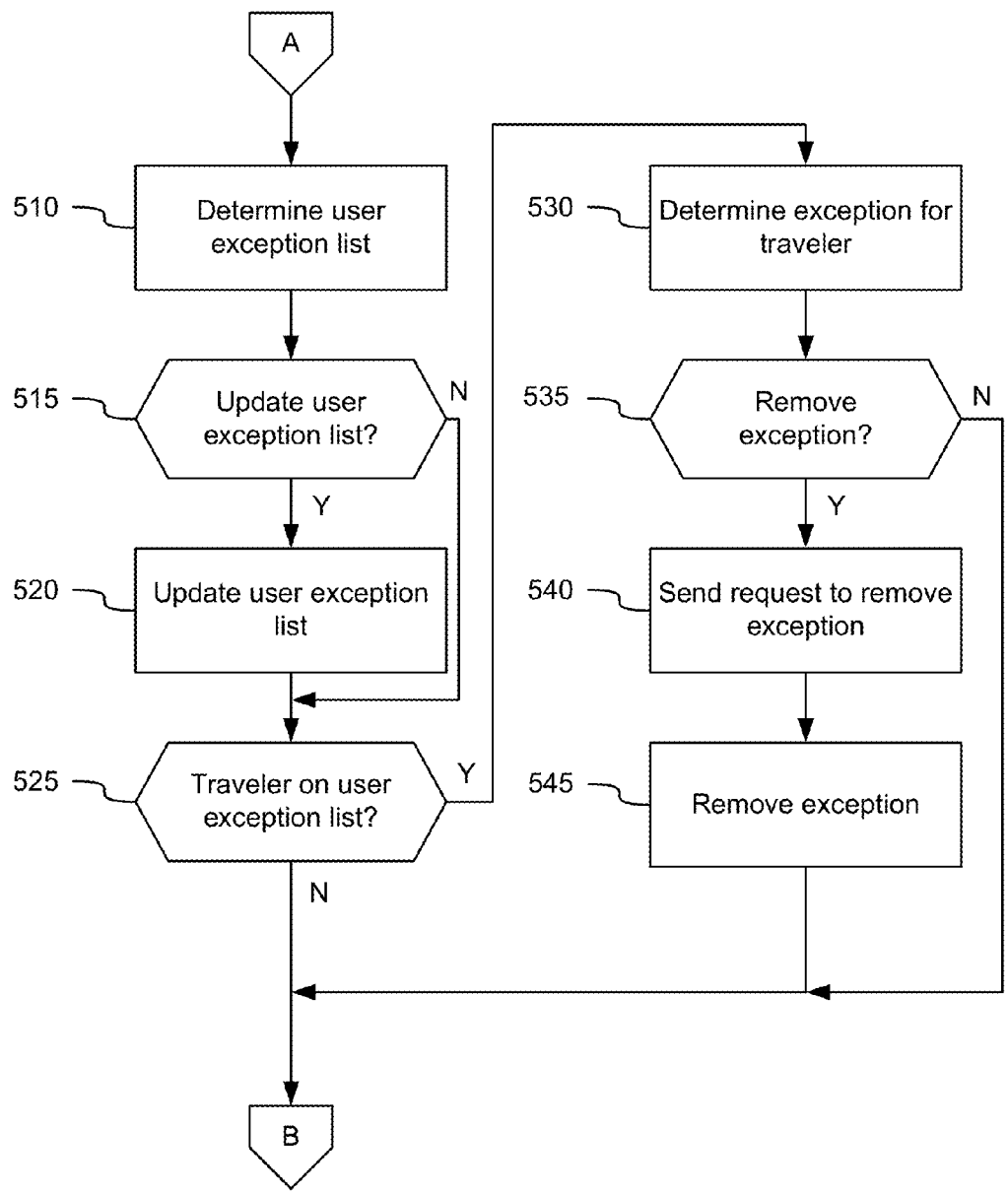
FIG. 5 illustrates an example of at least a portion of a flow diagram for determining and removing exceptions for a traveler in which various aspects of the disclosure may be implemented.

FIG. 5 illustrates an example of at least a portion of a flow diagram for determining and removing exceptions for a traveler in which various aspects of the disclosure may be implemented. As previously explained, an employee or other user may be exempt from certain security requirements. For example, most employees may have access to employer data outside of the company if they use particular data encryption, such as a virtual private network (VPN) tunnel or other encrypted tunnel to the employer's resources. In other words, employees might not have direct access to employer data via the Internet. However, some employees may be exempt from using a VPN, such as company executives, administrators, or other employees. These employees may be identified on an exception list. In some aspects, if the exempt employee is traveling to a country with a high level of security threats, the exception may be temporarily removed. The travel data correlating device may communicate with an exception management device to have the exception temporarily removed, as will be described in further detail below.

In step 510, the exception management device or the travel data correlating device may determine (e.g., access, retrieve, query, and the like) a user exception list. For example, the user exception list may identify an Employee A, an Employee B, and an Employee C that are exempt from accessing company data via an encrypted tunnel. These employees' devices (e.g., laptops, smartphones, tablets, and the like) may be configured to directly access company data from the Internet or another network. An interface, such as a web interface, may be used by administrators to manually update the exception list, such as by adding an employee or removing an employee from the list for each particular exception. The interface may comprise the same interface that is used to manually modify the list of countries with a high level of security threats or may comprise a different interface.

In step 515, the exception management device may determine whether to update the user exception list. For example, an administrator may input information for an employee to add to the list, such as name, employee ID, identifiers for the employee's devices, and other information identifying the employee or the employee's devices. The administrator may also remove employees or particular devices from the list. If the device determines to update the list (step: 515: Y), such as in response to input by an administrator, the device may update the user exception list in step 520.

In step 525, the exception management device or the travel data correlating device may determine whether the traveler identified as traveling to a country with a high level of security threats is on the user exception list or has a mobile device on the user exception list. If not (step 525: N), the method may proceed to step 610 illustrated in FIG. 6, as will be described in further detail below. If the traveler is on the exception list (step 525: Y), the exception management device may determine the exception for the traveler and/or devices associated with the traveler in step 530. For example, the traveler may be exempted from using VPN to access company data outside of the company.

In step 535, the exception management device may determine whether to remove the exception, such as temporarily during the duration of the user's travel or during the portion of the user's travel while the user is in the country with a high level of security threats. If so (step 535: Y), the exception management device may send a request to remove the exception in step 540 (or remove the exception itself in step 545). For example, an exception removal request may be sent to one or more individuals responsible for data security at the company. In some aspects, the exception management device or other computing device may remove the exception for all of the devices associated with the traveler or some of the user's devices. For example, the exception management device may remove the traveler from the VPN exception list, and the user may be required to use a VPN connection to access company data during the trip or portion of the trip in the country with a high level of security threats. Additionally or alternatively, exceptions may be removed for some, but not all of the traveler's devices. For example, the traveler might be able to access company data without a VPN connection on a laptop, but not on a smartphone.

Figure 6:
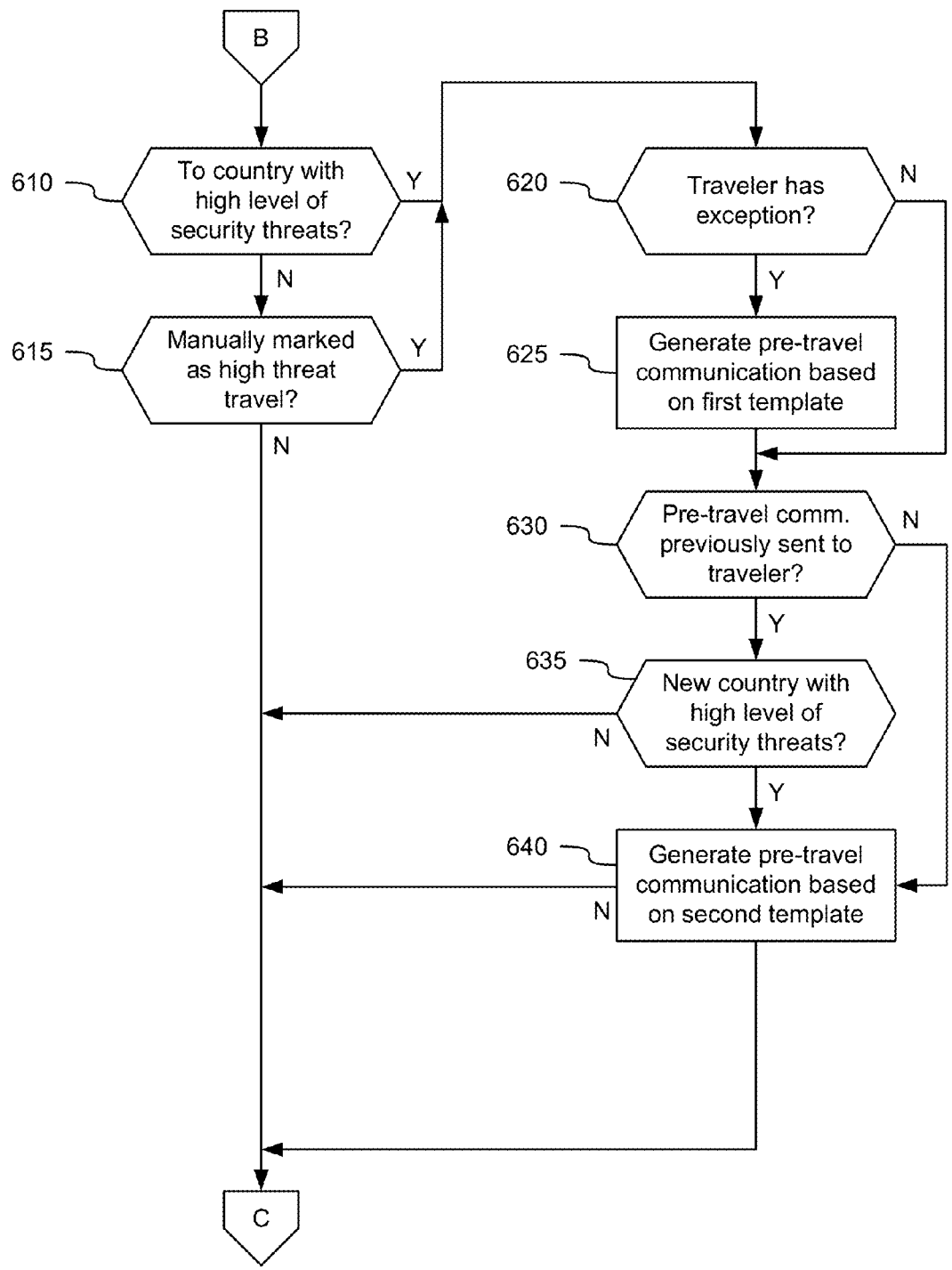
FIG. 6 illustrates an example of at least a portion of a flow diagram for generating pre-travel communication in which various aspects of the disclosure may be implemented.

FIG. 6 illustrates an example of at least a portion of a flow diagram for generating pre-travel communication in which various aspects of the disclosure may be implemented. A traveler may be sent communications (e.g., emails, web portal messages, text messages, and the like) prior to travel. The communications may indicate to the traveler, for example, that the user has been removed from an exception list and/or provide a link for data security training to the user. The travel data correlating device may communicate with the user awareness device to generate and/or send these communications.

In step 610, a computing device (e.g., the travel data correlating device and/or the user awareness device) may determine whether the user is traveling to a country with a high level of security threats. As previously explained, the user's itinerary may comprise a to city field, a to airport code, a to country field, or similar fields for intermediate or connecting locations on the departure trip. If none of these fields identifies a country with a high level of security threats (step 610: N), the computing device, in step 615, may determine whether the user's travel has otherwise been manually marked as travel indicating a high level of potential security threats, such as by an administrator of the company. If not (step 615: N), the computing device may proceed to step 710 illustrated in FIG. 7, as will be described in further detail below.

In step 620, the computing device may determine whether the traveler has an exception (e.g., is or was on an exception list). If so (step 620: Y), the computing device, in step 625, may automatically generate a pre-travel communication based on a first template. The pre-travel communication may indicate that the traveler has been removed from the user exception list. The pre-travel communication may also instruct the traveler what changes to the user's device(s) will be implemented. For example, the communication may instruct the traveler how to access company data using an encrypted tunnel, such as a VPN, if the traveler was previously exempted from having to use a VPN connection. The user awareness device may place the communication in a communication queue, such as an email queue, and/or enroll the user to receive an automated communication. The communication may be sent to the traveler a predetermined time prior to travel, such as 1 day, 7 days, or 2 weeks before travel begins.

In step 630, the computing device may determine whether a second pre-travel communication was previously sent to the traveler, such as within a predetermined time period (e.g., within the last year). The second pre-travel communication may include, for example, a link to data security training resources (e.g., a video, a slide show, or other resources teaching the user how to maintain data security in countries with a high level of security threats). If the communication including the link to data security training resources was previously sent to the traveler (step 630: Y), the computing device, in step 635, may determine whether the traveler is visiting a new country with a high level of security threats (e.g., a country the user has not previously traveled to or has not traveled to within the past year). If not (step 635: N), the computing device may proceed to step 710 illustrated in FIG. 7, as will be described in further detail below.

If, on the other hand, the traveler is visiting a new country with a high level of security threats (step 635: Y) or did not previously receive the pre-travel communication (step 630: N), the computing device, in step 640, may automatically generate the second pre-travel communication based on a second template. The pre-travel communication may provide awareness and/or training resources to the employee. For example, the communication may comprise an email having a link (e.g., a URL) to a training video, presentation slides, papers, or other resources teaching the employee how to protect data overseas. The user awareness device may place the communication in a communication queue, such as an email queue. The communication may be sent to the traveler a predetermined time prior to travel, such as 2 weeks before travel begins.

After the communication(s) are sent, the user awareness device may monitor whether the user has accessed one or more of the training resources via one or more links (e.g., whether the user has completed data security training). If not, the user awareness device may send one or more reminder communications for the user to access the training resources.

Figure 7:
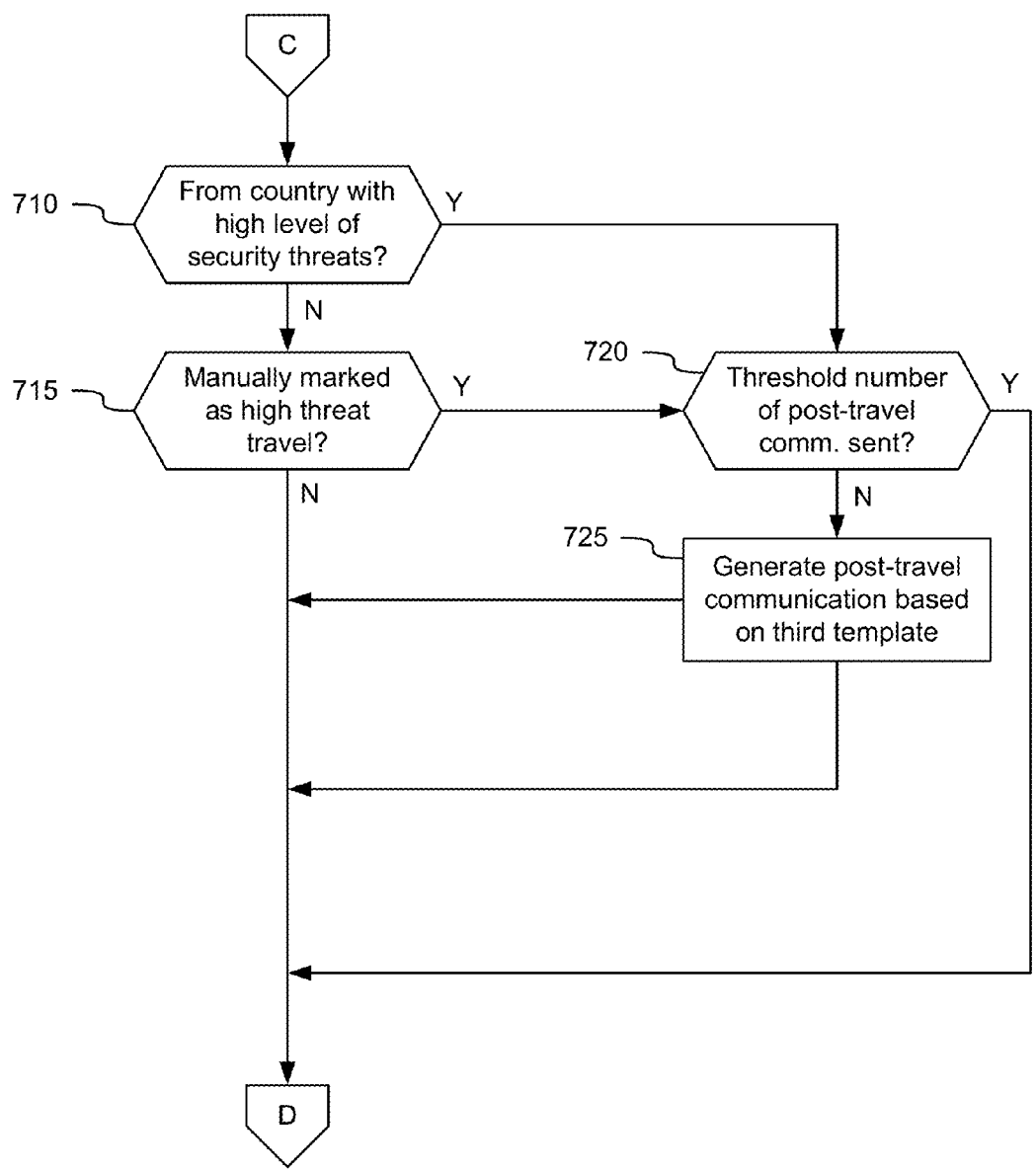
FIG. 7 illustrates an example of at least a portion of a flow diagram for generating post-travel communication in which various aspects of the disclosure may be implemented.

FIG. 7 illustrates an example of at least a portion of a flow diagram for generating post-travel communication in which various aspects of the disclosure may be implemented. A traveler may be sent communications (e.g., emails, web portal messages, text messages, and the like) after returning from travel. The communications may provide a link to a post-travel survey, which may include questions directed to data security while visiting the country with a high level of security threats. The travel data correlating device may communicate with the user awareness device to generate and/or send these communications.

In step 710, a computing device (e.g., the travel data correlating device and/or the user awareness device) may determine whether the user is traveling from a country with a high level of security threats. As previously explained, the user's itinerary may comprise a from city field, a from airport code, a from country field, or similar fields for intermediate or connecting locations on the return trip. If none of these fields identifies a country with a high level of security threats (step 710: N), the computing device, in step 715, may determine whether the user's travel has otherwise been manually marked as travel indicating a high level of potential security threats, such as by an administrator of the company. If not (step 715: N), the computing device may proceed to steps 810, 825, and/or 845 illustrated in FIG. 8, as will be described in further detail below.

In step 720, the computing device may determine whether a threshold number of post-travel communications (e.g., 2 communications, such as emails) for the identified country with a high level of security threats were previously sent to the user. If so (step 720: Y), the computing device may determine not to send another post-travel communication to the user, and proceed to steps 810, 825, and/or 845 illustrated in FIG. 8. If the user has not received the threshold number of post-travel communications (step 720: N), the computing device may proceed to step 725.

In step 725, the computing device may automatically generate a post-travel communication based on a third template. The post-travel communication may provide a post-travel survey or a link (e.g., a URL) to the survey to the employee. The survey may comprise data security questions, selected from a plurality of questions stored in a database, such as whether the user connected to a Wi-Fi network while traveling or during the portion in the country with a high level of security threats, whether the user connected to a cellular network, whether the user allowed others to inspect the user's device, whether the user noticed any differences in the device, such as a slowdown of applications or services, or any other question useful for identifying data security issues. The user awareness device may place the communication in a communication queue, such as an email queue. The communication may be sent to the traveler a predetermined time after travel, such as 2 days after the user returns from the trip or leaves the country with a high level of security threats.

After the communication(s) are sent, the user awareness device may monitor whether the user has accessed the survey via one or more links. If not, the user awareness device may send one or more reminder communications for the user to complete the survey.

Figure 8:
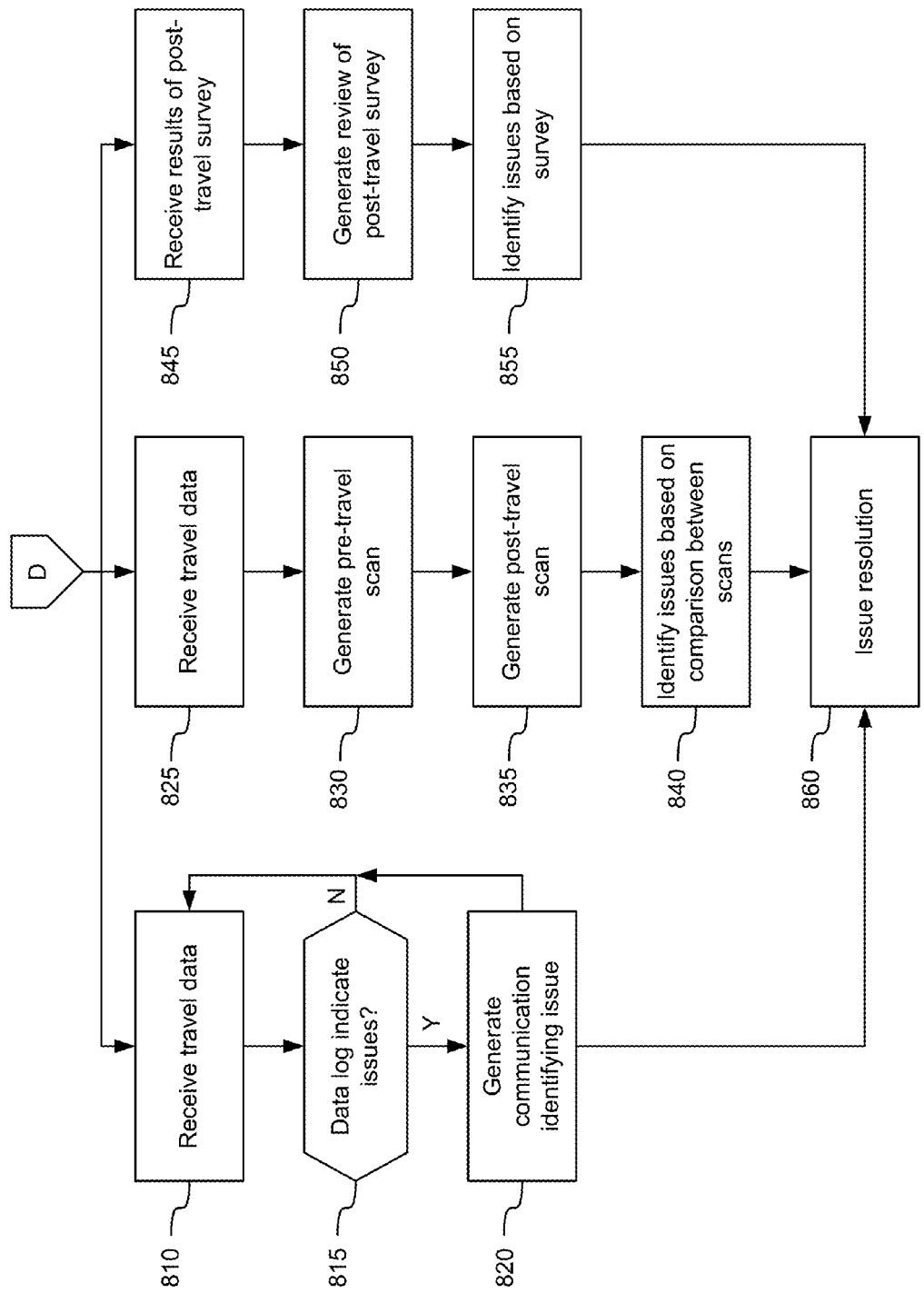
FIG. 8 illustrates an example of at least a portion of a flow diagram for identifying and resolving travel-related issues in which various aspects of the disclosure may be implemented.

FIG. 8 illustrates an example of at least a portion of a flow diagram for identifying and resolving travel-related issues (e.g., data security issues while traveling) in which various aspects of the disclosure may be implemented. FIG. 8 illustrates computing devices identifying travel-related issues in several ways, e.g., based on a user device's data log, based on a comparison between pre-travel and post-travel scans of the user device, and based on issues flagged in a post-travel survey. Any one or more of the three ways may be used to resolve issues. In some aspects, an issue detection and diagnosis device and/or the issue remediation device may be configured to perform the steps illustrated in FIG. 8.

Issues may be identified based on a user device's data log. In step 810, a computing device may receive, from a travel data source or a travel data correlating device, travel data for a user traveling to a country with a high level of security threats. The computing device may identify the devices associated with the user, and monitor the data logs for each identified device. The computing device may monitor these data logs in real-time (e.g., while the user is traveling) and/or periodically (e.g., every hour, every day, and the like). In some aspects, the user's device or another computing device (e.g., the issue detection and diagnosis device) may run a data security and monitoring application, such as a host-based intrusion prevention system (HIPS). The HIPS may monitor and analyze events occurring within the host and may optionally address malicious events, such as by preventing certain applications from running, from stopping certain applications, or otherwise blocking certain actions. The action taken by HIPS may be prior to, during, or after the execution of a malicious event.

In step 815, the computing device may determine whether the monitored data log indicates any issues (e.g., anomalies). For example, the computing device may monitor for attacks on certain applications, such as particular brands of applications, and/or monitor for attacks on a storage device of the user device (e.g., a hard drive, a solid state drive, the RAM, or any other storage device). As previously explained, the data security and monitoring application on the user's device may automatically address the issue, such as by preventing or stopping malicious code from executing. In step 820, the user's device may additionally or alternatively generate a communication (e.g., an email or other electronic communication) identifying the issue, and send the communication to the issue detection and diagnosis device.

FIG. 11 illustrates example data from a data log 1100 in which various aspects of the disclosure may be implemented. For example, the data log 1100 may identify issues flagged by the data security and monitoring application running on the user device and/or actions taken to address the issues. The data log 1100 may identify the user of the device, such as by employee ID, associate NBID, PNR, first name, and/or last name. The data log 1100 may also include the user's travel information, such as the from city, the from country, the to city, the to country, the departure date and time, and/or the arrival date and time.

The data log 1100 may identify the time of the malicious event (or the time that the event was addressed by the application) as identified by detectedutc (e.g., 12:02:30 AM). The data log 1100 may identify the source of the malicious event. For example, the data log 1100 may include a sourceusername, such as CORP\XXXXXXX, identifying a username (if applicable) of the threat source. The data log 1100 may include a serverid (e.g., MACHINE123) identifying the ID of the server where the threat came from. The data log 1100 may include an IP address of the source, such as ##.###.###.### (e.g., if the source has an IPv4 IP address). The data log 1100 may also include a URL for the threat (e.g., file:///C:\PROGRAM FILES (X86) \PRODUCTIVITY\EMAIL.EXE).

The data log 1100 may identify the target of the malicious event. For example, the data log 1100 may include an IP address of the target, such as ##.###.###.### (e.g., if the target has an IPv4 IP address). The data log 1100 may also indicate a file name of the target, as indicated as targetfilename.

The data log 1100 may comprise information describing the malicious event. For example, the data log 1100 may identify the category of the threat (e.g., hip.Files). The data log 1100 may comprise an event identifier for the threat (e.g., 18000) so that the threat may be identified among numerous events occurring on the user device. The data log 1100 may identify the severity of the threat. For example, severity may be rated on a scale from 1 to 5 (with 5 being the highest severity), and may indicate that the identified threat has a severity level of 4. The data log may also comprise various other fields, such as receivedutc, signatureid, signaturetypeid, islogeneabled, iscreatelocalexenabled, and isdeleted. The receivedutc field may comprise the timestamp of when the log file containing the activity was received. The signatureid field may comprise a unique threat signature ID for each signatures that is used in the HIPS software. The signaturetypeid field may identify the operating system. The islogenabled field may indicate the log status. The iscreatelocalexenabled field may indicate whether the creation of client rules is allowed. The isdeleted field may indicate whether the detected file was deleted.

Returning to FIG. 8, the data log 1100 or any other data logs identifying threats may be sent for issue resolution in step 860, as will be described in further detail below. In some aspects, received data logs may be used to generate trend data for a plurality of devices to map and predict future threats to company resources. The data may also be stored in a database.

Issues may also be identified based on a comparison between pre-travel and post-travel scans of the user device. In step 825, the issue detection and diagnosis device may receive travel data, similar to step 810 previously described. In step 830, the issue detection and diagnosis device may generate a pre-travel scan of the user's device(s), such as a laptop, smartphone, virtual devices (e.g., virtual desktop, virtual machine), or any other virtual or physical devices. The pre-travel scan may be performed before the user begins traveling and/or before the user enters a country with a high level of security threats and be used to establish a baseline data log.

In step 835, the issue detection and diagnosis device may generate a post-travel scan of the user's device(s), such as after the user returns from his or her trip and/or leaves a country with a high level of security threats. The post-travel scan may be performed on the same devices that received a pre-travel scan.

FIG. 12 illustrates example summary 1200 of scanned devices in which various aspects of the disclosure may be implemented. The summary 1200 may comprise information identifying the user, such as personnel number, personnel ID, full name, email address, PNR, first name, and/or last name. The summary 1200 may comprise travel information, such as to city name, to country name, from city name, from country name, depart date, and arrival date. The summary 1200 may also identify the home country of the user (e.g., Hong Kong). The summary 1200 may comprise a simplified version of travel data, and may be stored in a shared folder for device scanning purposes.

The summary 1200 may identify the machines or other devices associated with the user that have been scanned before and/or after travel. For example, the summary 1200 may identify four of the user's devices that have been scanned, including MACHINE123456 (a physical machine), MACHINE234567 (a physical machine), VMACHINE12345 (a virtual machine), and VMACHINE23456 (a virtual machine). The summary 1200 may also identify a band (e.g., 3). Bands may be used to group jobs across the company similar in scope and complexity, organizational impact, degree of independent judgment and discretion, and/or knowledge and skill levels.

Returning to FIG. 8, in step 840, the issue detection and diagnosis device may identify issues (e.g., malware, viruses, unauthorized data accesses, malicious changes to the device, and the like) based on a comparison between the pre-travel scan and the post-travel scan. The comparison may identify, for example, changes in signatures, keys, executables, registry settings, libraries, files, and the like. For example, the comparison may reveal a file that did not exist in the pre-travel scan, but does exist in the post-travel scan. The comparison may identify a file that has been manipulated according to the post-travel scan. The comparison may identify files that are not typically accessed, but were accessed during the user's travel. The comparison may also identify anomalous access dates of certain files. In some aspects, hashes of files from the user's devices may be sent to conventional antivirus and/or malware software for the conventional software to perform an analysis (e.g., comparison) of the scanned data.

Optionally, the issue detection and diagnosis device may limit the comparison performed in step 840 by time frame and/or issues known for a particular country with a high level of security threats. The device may access travel data for the user to determine the time frame that the user will be travelling or in the countries with a high level of security threats (e.g., based on flight schedule, accommodation schedule, and the like). The device may perform the comparison for the data log generated during the determined time frame rather than the device's entire data log. The device may additionally or alternatively access travel data to determine the particular country with a high level of security threats or countries visited by the user. The device may query a database to determine known issues for that particular country, and identify anomalies in the post-travel scan corresponding to the known issues, rather than scanning for all potential issues.

FIGS. 13A-H illustrate an example analysis report for scanned data in which various aspects of the disclosure may be implemented. For example, the analysis report may be generated by a computing device in response to the comparison performed in step 840, and may be used by an administrator of the entity to address and/or identify data security issues.

With reference to FIG. 13A, the portion 1310 of the analysis report may identify the name of the user, the departure date and/or return date of the user, and/or the name of the machine associated with the user. The portion 1310 may indicate the number of positive identifications of viruses (e.g., 4 instances). This may comprise the total number of positive identifications among, for example, processes running on the device, metadata from the device, and/or registry data from the device. The portion 1310 may also comprise a snapshot differential. The snapshot differential on the report comprise a header. However, the meaning may be related to the pre and post travel scans. Once the post travel scan is completed, both pre and post travel reports may be run in a comparison script. The output of comparison may comprise the changes or delta of the pre and post travel scans.

FIGS. 13B-D illustrate a portion 1320A-C of the analysis report that identifies changes made to processes running on the device, which may be flagged based on the comparison performed in step 840. With reference to FIG. 13B, the portion 1320A may list processes flagged during the comparison and the number of processes flagged (e.g., 13). The portion 1320A may list the process name, such as process1.exe, process2.exe, process3.exe, and the like. The portion 1320A may list the instance name for the flagged process, such as OS Search, process2.exe, process3.exe, and the like. The portion 1320A may list whether the process was hidden (e.g., true) or not hidden (e.g., false). The portion 1320A may list the process ID (e.g., 4928, 7468, 5812, and the like) and a parent process ID (e.g., 0, 7564, 716, and the like). The portion 1320A may list the executable size of the process (e.g., 593408 bytes, 2872320 bytes, 1842352 bytes, and the like). The portion 1320A may list hashes generated for the corresponding process. The portion 1320A may also list a file path for the corresponding process.

With reference to FIG. 13C, the portion 1320B may comprise a continuation from the portion 1320A illustrated in FIG. 13B. The portion 1320B may list a parameter for the corresponding service (if applicable). The parameter may comprise an execution parameter to modify its functionality. The portion 1320B may also list the dynamic link library (DLL) path or other library used by the corresponding service (if applicable). The portion 1320B may identify the process type of the service, such as whether the process is a Service or an Application. The portion 1320B may list the DLL file used by the corresponding service (e.g., OShttp.dll, update.dll, stillimage.dll). The portion 1320B may list the start time of the corresponding service. The portion 1320B may also list a user name for the corresponding service (e.g., Local System, CORP\XXXXXXX, NT AUTHORITY\SYSTEM, and the like). The user name may comprise a machine account name.

With reference to FIG. 13D, the portion 1320C may comprise a continuation from the portion 1320A illustrated in FIG. 13B and the portion 1320B illustrated in FIG. 13C. The portion 1320C may list, as DllCount, the number of times the DLL is loaded into the corresponding process (e.g., 70 times, 210 times, 173 times, and the like). The portion 1320C may identify the service type of the process, such as own process or shared process. The portion 1320C may identify, for each listed service, whether the service is a 64 bit process, whether the service is running or not, and whether it is a file name only (e.g., whether or not it is metadata or file content). The portion 1320C may optionally list the root directory of the process and the UserID. The portion 1320C may also list whether the issue detection and diagnosis device has determined that the process is or contains a virus (or is otherwise malicious). If not, the portion 1320C may identify the VirusAnalysis as FALSE. On the other hand, the portion 1320C may identify the VirusAnalysis as POSITIVE if the device has determined that the process is or contains a virus. As previously explained, data from the process may be run through a conventional antivirus or malware tool, which may be used to determine whether there is a virus.

FIGS. 13E-G illustrate a portion 1330A-C of the analysis report that identifies changes made to metadata on the device, which may be flagged based on the comparison performed in step 840. With reference to FIG. 13E, the portion 1330A may list metadata flagged during the comparison and the number of metadata changes flagged (e.g., 14). The portion 1330A may list the ID for each metadata flagged (e.g., 80588, 82057, 82340, and the like). The portion 1330A may also list the file name where the metadata can be found (e.g., SyspiciousTransfer.pdf.jar, Jan1Travelers.xls, IncompleteInformation.pdf.jar, and the like). The portion 1330A may also identify the file extension (e.g., jar, xls, and the like). The portion 1330A may list collected and/or duplicate for the metadata. The portion 1330A may also comprise a description of the status of the metadata, such as file, archive, deleted, not indexed, and the like.

With reference to FIG. 13F, the portion 1330B may comprise a continuation from the portion 1330A illustrated in FIG. 13E. The portion 1330B may identify the date and/or time that the corresponding metadata was accessed, created, and/or written. The portion 1330B may also identify the logical size of the metadata (e.g., 49971 bytes, 196096 bytes, 49971 bytes, and the like) and/or the physical size of the metadata (e.g., 53248 bytes, 196608 bytes, 53248 bytes, and the like). The portion 1330B may include a hash generated for the metadata.

With reference to FIG. 13G, the portion 1330C may comprise a continuation from the portion 1330A illustrated in FIG. 13E and the portion 1330B illustrated in FIG. 13F. The portion 1330C may list the full path of the metadata. The portion 1330C may also list any comments on the metadata. The portion 1330C may also list whether the issue detection and diagnosis device has determined that the metadata is or contains a virus (or is otherwise malicious). If not, the portion 1330C may identify the VirusAnalysis as FALSE. On the other hand, the portion 1330C may identify the VirusAnalysis as POSITIVE if the device has determined that the metadata is or contains a virus. As previously explained, metadata may be run through a conventional antivirus or malware tool, which may be used to determine whether there is a virus. FIG. 13G illustrates four instances where the issue detection and diagnosis device has determined that the metadata is or contains a virus. The portion 1330C may identify the hash for data determined to be malicious.

FIG. 13H illustrate a portion 1340 of the analysis report that identifies changes made to registries of the device, which may be flagged based on the comparison performed in step 840. The portion 1340 may list registry files identified during the comparison and the number of registry file changes (e.g., 3). The portion 1340 may identify a search term for the registry file. The search term may comprise the key that the registry is searching for on the device. The portion 1340 may identify a path for the corresponding registry entry. The portion 1340 may identify the name of the registry (e.g., Testtesttest, Thisisatest, and the like). The portion 1340 may also identify the registry type (e.g., REG_SZ). The portion 1340 may also identify data (e.g., Test!!!!!, TestValue!!), which may comprise the file that is being scanned. The portion 1340 may also identify a last written date and/or time for the registry entry.

Returning to FIG. 8, issues may also be identified based on issues flagged in a post-travel survey completed by the user. As previously explained, an electronic survey may be sent to the user after the user returns from a trip and/or from the country with a high level of security threats. In step 845, the issue detection and diagnosis device may receive the results (e.g., user answers) of the post-travel survey. In step 850, the device may generate a review of the post-travel survey. For example, if the user answered yes to a particular question on the survey, the device may flag that answer for review by an administrator. The device might not flag, for example, no answers. In step 855, the device (or an administrator) may identify issues based on the results of the survey.

The results of each of the foregoing analyses may be sent to an issue remediation device and/or an administrator of the device. In step 860, the data security issue may be resolved. For example, if malicious software was installed on the user's device, the issue remediation device may automatically remove the malicious software. If a registry entry was modified, and the modification is determined to be malicious, the issue remediation device may remove the malicious registry entry and/or reinstall the original registry entry. The device may also investigate for any exfiltration of company or personal data from data logs on the user's device. Any of the issues previously described may be resolved by the issue remediation device and/or an administrator in step 860.

As previously explained, a user may typically have a data security exception, such as the ability to access company data without using a VPN or other secure tunneling. As also previously explained, the exception may be removed if the user is traveling to a country with a high level of security threats. For example the user may access company data using a VPN while traveling in the country with a high level of security threats. After the user returns from the trip (or leaves the country with a high level of security threats), the user's exception(s) may be reinstated.

Figure 9:
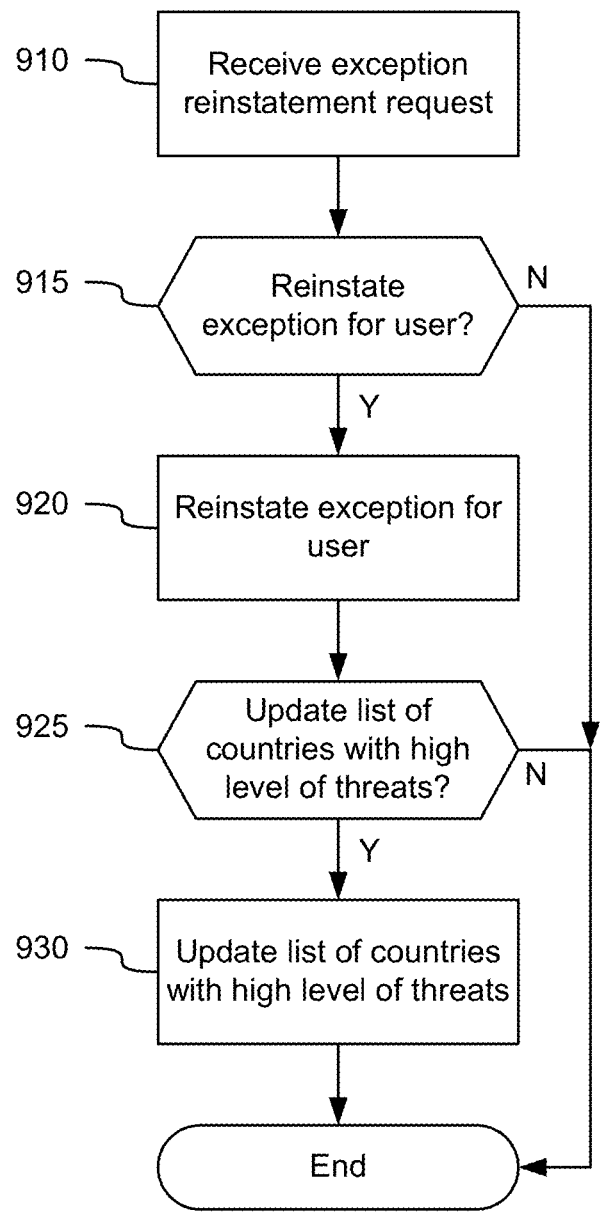
FIG. 9 illustrates an example of at least a portion of a flow diagram for reinstating exceptions or updating a list of countries with a high level of security threats in which various aspects of the disclosure may be implemented.

FIG. 9 illustrates an example of at least a portion of a flow diagram for reinstating exceptions or updating a list of countries with a high level of security threats in which various aspects of the disclosure may be implemented. In some aspects, the travel data correlating device and/or the exception management device may be configured to perform the steps illustrated in FIG. 9.

In step 910, a computing device (e.g., the exception management device) may receive a request to reinstate an exception. The request may identify the user, the exception, and the reason for reinstating the exception (e.g., the user has left a country with a high level of security threats and is currently located in a country with a low level or a medium level of security threats). In step 915, the computing device may determine whether to reinstate the exception. For example, the computing device may confirm that the user is not currently in a country with a high level of security threats based on the location of the user's device(s). Additionally or alternatively, the computing device may generate a notification displayable on an administrator's device requesting the administrator to reinstate the exception. In step 920, the computing device may reinstate the exception if it receives an input from the administrator instructing the computing device to do so and/or if it determines that the user is not currently in a country with a high level of security threats.

In step 925, a computing device (e.g., the travel data correlating device) may determine whether to update the list of countries with a high level of security threats. If so (step 925: Y), the computing device may update the list of countries with a high level of security threats in step 930. For example, a country may be manually added to the list by an administrator and/or cyber security team member. Additionally or alternatively, a country may be added to the list if a cybersecurity event occurred in that country (e.g., as determined in step 840) while the user was traveling there, even if the country was not previously categorized as a country with a high level of security threats.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method comprising:
   receiving, at a computing device and from a travel data source, travel data for a user;
   receiving, at the computing device, a list of countries with a high level of cyber security threats;
   based on a comparison of the travel data for the user to the list of countries with a high level of cyber security threats, determining, by the computing device, whether the user is scheduled to enter a country with a high level of cyber security threats;
   in response to determining that the user is scheduled to enter the country with a high level of cyber security threats, determining a user device associated with the user;
   receiving, at the computing device, a first data security scan of the user device, wherein the first data security scan is performed at the user device, and wherein the first data security scan of the user device occurs at a first time before the user enters the country with a high level of cyber security threats;
   receiving, at the computing device, a second data security scan of the user device, wherein the second data security scan is performed at the user device, and wherein the second data security scan of the user device occurs at a second time after the user leaves the country with a high level of cyber security threats and in response to a determination that the user device entered the country with the high level of cyber security threats;
determining one or more data security issue of the user device based on a comparison of the first data security scan to the second data security scan;
based on the comparison of the first data security scan to the second data security scan, transmitting, from the computing device, a list of the one or more data security issue to remove from the user device; and
in response to transmitting the list, removing the one or more data security issue from the user device.

2. The method of claim 1, wherein the one or more data security issue of the user device comprises one or more of execution of a process on the user device, a change to metadata on the user device, or a change to a registry on the user device.

3. The method of claim 1, further comprising:
generating a report identifying the one or more data security issue determined based on the comparison of the first data security scan to the second data security scan.

4. The method of claim 1, further comprising:
in response to determining that the user device has a data security exception and before the user enters the country with a high level of cyber security threats, removing, by the computing device, the data security exception for the user device for a predetermined time period.

5. The method of claim 4, wherein the predetermined time period comprises a duration of travel for the user or a duration that the user will be located in the country with a high level of cyber security threats.

6. The method of claim 1, further comprising:
generating, by the computing device, an electronic pre-travel communication that provides data security training resources to the user; and
placing the pre-travel communication in a communication queue to be sent to the user a predetermined time period prior to travel.

7. The method of claim 1, further comprising:
generating, by the computing device, an electronic post-travel communication that provides a post-travel survey to the user; and
placing the post-travel communication in a communication queue to be sent to the user a predetermined time period after travel or after the user is expected to leave the country with a high level of cyber security threats.

8. An apparatus, comprising:
a processor; and
memory storing computer-executable instructions that, when executed by the processor, cause the apparatus to:
receive, from a travel data source, travel data for a user;
receive a list of countries with a high level of cyber security threats;
based on a comparison of the travel data for the user to the list of countries with a high level of cyber security threats, determine whether the user is scheduled to enter a country with a high level of cyber security threats;
in response to determining that the user is scheduled to enter the country with a high level of cyber security threats, determine a user device associated with the user;
receive a first data security scan of the user device, wherein the first data security scan is performed at the user device, and wherein the first data security scan of the user device occurs at a first time before the user enters the country with a high level of cyber security threats;
receive a second data security scan of the user device, wherein the second data security scan is performed at the user device, and wherein the second data security scan of the user device occurs at a second time after the user leaves the country with a high level of cyber security threats and in response to a determination that the user device entered the country with the high level of cyber security threats;
determine one or more data security issue of the user device based on a comparison of the first data security scan to the second data security scan;
based on the comparison of the first data security scan to the second data security scan, transmit a list of the one or more data security issue to remove from the user device; and
in response to transmitting the list, cause removal of the one or more data security issue from the user device.

9. The apparatus of claim 8, wherein the one or more data security issue of the user device comprises one or more of execution of a process on the user device, a change to metadata on the user device, or a change to a registry on the user device.

10. The apparatus of claim 8, wherein the memory stores additional computer-executable instructions that, when executed by the processor, cause the apparatus to:
generate a report identifying the one or more data security issue determined based on the comparison of the first data security scan to the second data security scan.

11. The apparatus of claim 8, wherein the memory stores additional computer-executable instructions that, when executed by the processor, cause the apparatus to:
in response to determining that the user device has a data security exception and before the user enters the country with a high level of cyber security threats, remove the data security exception for the user device for a predetermined time period.

12. The apparatus of claim 11, wherein the predetermined time period comprises a duration of travel for the user or a duration that the user will be located in the country with a high level of cyber security threats.

13. The apparatus of claim 8, wherein the memory stores additional computer-executable instructions that, when executed by the processor, cause the apparatus to:
generate an electronic pre-travel communication that provides data security training resources to the user; and
place the pre-travel communication in a communication queue to be sent to the user a predetermined time period prior to travel.

14. The apparatus of claim 8, wherein the memory stores additional computer-executable instructions that, when executed by the processor, cause the apparatus to:
generate an electronic post-travel communication that provides a post-travel survey to the user; and
place the post-travel communication in a communication queue to be sent to the user a predetermined time period after travel or after the user is expected to leave the country with a high level of cyber security threats.

15. A non-transitory computer-readable medium having instructions stored thereon that, when executed, cause a computing device to:
receive, from a travel data source, travel data for a user;
receive a list of countries with a high level of cyber security threats;

based on a comparison of the travel data for the user to the list of countries with a high level of cyber security threats, determine whether the user is scheduled to enter a country with a high level of cyber security threats;

in response to determining that the user is scheduled to enter the country with a high level of cyber security threats, determine a user device associated with the user;

receive a first data security scan of the user device, wherein the first data security scan is performed at the user device, and wherein the first data security scan of the user device occurs at a first time before the user enters the country with a high level of cyber security threats;

receive a second data security scan of the user device, wherein the second data security scan is performed at the user device, and wherein the second data security scan of the user device occurs at a second time after the user leaves the country with a high level of cyber security threats and in response to a determination that the user device entered the country with the high level of cyber security threats;

determine one or more data security issue of the user device based on a comparison of the first data security scan to the second data security scan;

based on the comparison of the first data security scan to the second data security scan, transmit a list of the one or more data security issue to remove from the user device; and in response to transmitting the list, cause removal of the one or more data security issue from the user device.

16. The non-transitory computer-readable medium of claim 15, having additional computer-readable instructions stored thereon that, when executed, cause the computing device to:

generate a report identifying the one or more data security issue determined based on the comparison of the first data security scan to the second data security scan.

17. The non-transitory computer-readable medium of claim 15, having additional computer-readable instructions stored thereon that, when executed, cause the computing device to:

in response to determining that the user device has a data security exception and before the user enters the country with a high level of cyber security threats, remove the data security exception for the user device for a predetermined time period.

18. The non-transitory computer-readable medium of claim 17, wherein the predetermined time period comprises a duration of travel for the user or a duration that the user will be located in the country with a high level of cyber security threats.

19. The non-transitory computer-readable medium of claim 15, having additional computer-readable instructions stored thereon that, when executed, cause the computing device to:

generating, by the computing device, an electronic pre-travel communication that provides data security training resources to the user; and placing the pre-travel communication in a communication queue to be sent to the user a predetermined time period prior to travel.

20. The non-transitory computer-readable medium of claim 15, having additional computer-readable instructions stored thereon that, when executed, cause the computing device to:

generate an electronic post-travel communication that provides a post-travel survey to the user; and place the post-travel communication in a communication queue to be sent to the user a predetermined time period after travel or after the user is expected to leave the country with a high level of cyber security threats.

* * * * *